US012698824B2

(12) United States Patent
Knoell et al.

(10) Patent No.: US 12,698,824 B2
(45) Date of Patent: Aug. 4, 2026

(54) LINEAR ACTUATOR WITH DEAERATION OF THE EXTENSION ARM BY WAY OF A CHECK VALVE

(71) Applicant: Robert Bosch GmbH, Stuttgart (DE)

(72) Inventors: Reiner Knoell, Burgsinn (DE); Marco Knoell, Burgsinn (DE); Michael Goldbach, Lohr A. Main (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/957,786

(22) Filed: Nov. 24, 2024

(65) Prior Publication Data

US 2025/0172200 A1     May 29, 2025

(30) Foreign Application Priority Data

Nov. 27, 2023     (DE) ...................... 10 2023 211 779.7

(51) Int. Cl.
*F16H 25/00*     (2006.01)
*F16H 25/20*     (2006.01)
*F16H 25/24*     (2006.01)

(52) U.S. Cl.
CPC .............. *F16H 25/20* (2013.01); *F16H 25/24* (2013.01)

(58) Field of Classification Search
CPC ...... F16H 25/20; F16H 57/0497; F16H 25/24; F16N 1/00
See application file for complete search history.

(56) References Cited

U.S. PATENT DOCUMENTS

2012/0042741 A1* 2/2012 Jacob .................. F16H 57/0464
74/89.44

FOREIGN PATENT DOCUMENTS

DE      10 2020 212 703 A1     4/2022
WO      WO-2011047779 A1 *     4/2011     ............... H02K 7/06

* cited by examiner

*Primary Examiner* — Zakaria Elahmadi
(74) *Attorney, Agent, or Firm* — Maginot, Moore & Beck LLP

(57)     ABSTRACT

An actuator includes a housing, an extension arm, and a threaded spindle. The threaded spindle is rotatably supported on the housing with respect to the center axis of the threaded spindle. The extension arm projects slidably out of the housing in the direction of the center axis. The housing and the extension arm together surround an interior space, whose volume changes as the extension arm moves. One end of the threaded spindle projects into a tubular portion of the extension arm, regardless of the position where the extension arm is located. The tubular portion extends about the central axis with a constant internal cross-sectional shape. The end of the threaded spindle is connected to a piston, which divides the internal space into a first region and a second region such that the first and second regions are separated from each other in a fluid-tight manner. The first region is only delimited by the piston and the extension arm. The second region is sealed against the environment in a fluid-tight manner. A check valve is arranged between the first region and the second region in the piston. The check valve passes fluid in a first direction from the second region to the first region of the extension arm and blocks the passage of fluid in a second direction opposite to the first.

10 Claims, 3 Drawing Sheets

LINEAR ACTUATOR WITH DEAERATION OF THE EXTENSION ARM BY WAY OF A CHECK VALVE

This application claims priority under 35 U.S.C. § 119 to application no. DE 10 2023 211 779.7, filed on Nov. 27, 2023 in Germany, the disclosure of which is incorporated herein by reference in its entirety.

The present disclosure relates to a linear actuator with deaeration of the extension arm thereof, e.g. a lift cylinder.

BACKGROUND

An (electromechanical) linear actuator is generally known in the prior art. For example, DE 10 2020 212 703 A1 proposes supporting a threaded spindle that drives a nut connected to a center sleeve or an extension arm such that a piston at the end of the threaded spindle delimits a first region of a second region in a fluid-tight manner. The first region is located in the center sleeve, is completely filled with ambient air, and can be connected to the environment via a ventilation breakthrough. Given rapid movement of the linear actuator, pipe noises through the air flow can occur at this ventilation breakthrough. Particularly when used outdoors, condensation water can also form in the first region and can adversely affect the service life. Therefore, it is desirable to deviate from this teaching and completely seal the first region. For this purpose, the first region must have enough minimum volume so that the seals between the first and second regions are not overloaded by the pressure fluctuations when the linear actuator is rapidly retracted and extended.

The second region is a cavity, which is partially filled with lubricating oil and in which the threaded spindle is located. The threaded spindle is connected to the sleeve, which functions as an extension arm. If the threaded spindle extends, the pressure in this second region decreases. If it retracts, the pressure increases due to the displacement by the spindle. At the end of the spindle, a piston is provided for sealing against the extension arm. In addition, the outer side of the extension arm is sealed against a housing of the linear actuator by a second seal and guided within it. The interior of the housing is hermetically sealed against the outside world and filled with a mixture of gas and fluid, which is used for cooling and lubrication. If this internal space is closed in the retracted state of the extension arm, a negative pressure forms when the extension arm is extended. Conversely, positive pressure may then build up between the threaded spindle and the second seal when retracting again if the fluid cannot drain off well enough at the threaded nut.

Since the positive pressure in the first region and negative pressure in the second region (or vice versa) occur simultaneously, it is unavoidable that small quantities of lubricating oil pass the piston seal from the second cavity into the first cavity because the second cavity is very largely filled with oil, and pressure fluctuations also occur there when the electric cylinder moves. In addition, the lubricating oil in the second cavity is in strong motion because it has to flow through the threaded nut so that the electric cylinder can be moved at all. This flow constriction, in conjunction with the movement of the threaded nut, drives the said flow into the second cavity. External leakage occurs when seals wear.

In the reverse direction, from the first region to the second region, there is virtually no oil exchange or delivery of oil because, in the first region, the pressure is usually below atmospheric pressure. Over time, this causes lubricating oil to accumulate in the first region, which in extreme cases restricts the maximum possible path of movement of the electric cylinder if it cannot be discharged from the first region. This can lead to pressure peaks in the first region, which in turn damages the floating bearing of the spindle piston. Therefore, in the prior art explained hereinabove, the connection to the outside air is provided in order to avoid these pressure peaks.

In contrast to avoiding the pressure peaks by connecting to the outside air according to the prior art described, the present disclosure has the task of guiding the lubricating oil from the first cavity back into the second cavity, wherein the electric cylinder always remains hermetically sealed to the outside.

SUMMARY

To solve this problem, the present disclosure proposes an actuator comprising a housing, an extension arm, and a threaded spindle. The threaded spindle is rotatably supported on the housing with respect to the center axis of the threaded spindle. The extension arm projects slidably out of the housing in the direction of the center axis. The housing and the extension arm together surround an interior space, whose volume changes as the extension arm moves. One end of the threaded spindle projects into a tubular portion of the extension arm, regardless of the position where the boom is located. The tubular portion extends about the center axis with a constant internal cross-sectional shape. The end of the threaded spindle is connected to a piston, which divides the internal space into a first region, preferably only filled with a gas, and a second region, preferably filled with a gas-liquid mixture such that the first region and second region are separated from each other in a fluid-tight manner. The first region is only delimited by the piston and the extension arm. The first region and the second region are (each) sealed against the environment in a fluid-tight manner. A check valve arranged between the first region and the second region in the piston allows fluid to pass in a first direction from the second region into the first region and blocks the passage of fluid in a second direction opposite the first.

Specifically, as a result of the present disclosure, the internal space of an extension arm, which is substantially completely sealed against the environment, is automatically deaerated when needed. The deaeration of the extension arm is performed by way of a check valve between the internal space of the extension arm and bores or fluid passages in the piston and in the spindle by enabling a fluid flow in a first direction from the internal space of the extension arm to the bores in the piston and preventing a fluid flow in a second direction opposite to the first direction. One preferred embodiment of the check valve comprises a curved support disc, a membrane, and a piston cover. The support disc, the membrane, and the piston cover are assembled such that the support disc pushes the membrane onto the piston cover. For this purpose, the support disc preferably has a pretension. Both the membrane and piston cover each comprise passage holes. In the assembled state, the passage holes in the membrane are angularly offset from those in the piston cover, i.e., they are not aligned. In a first operating position, the internal space of the extension arm is sealed and in a second/other operating position, the membrane is lifted away from the piston cover to enable a fluid connection between the passage holes in the membrane and the passage holes in the piston cover.

Using such an arrangement enables a pressure of a fluid from the direction of the support disc to press this disc against the piston cover, thus reinforcing the seal because the rigid piston cover lies behind the holes in the membrane, and the membrane is pressed on in front of the holes in the piston cover. As a result, a fluid cannot readily pass through the membrane and piston cover from the side of the support disc. Conversely, if pressure builds up in the extension arm, then this pressure will act on the deformable membrane through the holes in the piston cover. The membrane is forced onto the piston cover by the pressure of the pretensioned curved support disc, so no fluid will overflow at low pressure in the extension arm. Only when the compression force of the fluid passing through the holes in the piston cover exceeds the pretension force of the support disc is the membrane lifted off at the holes in the piston cover. The fluid can then pass through the piston cover and reach the holes in the lifted membrane as well as through them further into the space behind the support disc, i.e. on the side of the support disc facing the spindle.

The support disc can be curved at least in the original state (i.e., in the uninstalled/unassembled state). The curvature is then aligned in the installed state in the direction of the membrane. If such a support disc is installed, then the curvature is elastically reduced during installation such that the support disc exerts an elastic force on the membrane, which forces or pushes it onto the piston cover. As a result, the function as a check valve explained hereinabove can easily be provided by forcing the membrane onto the piston cover.

The support disc is preferably still curved, even in the assembled state. The support disc must indeed develop a pretension in the assembled state, and this is advantageously achieved by reducing the curvature via compression of the structure during assembly. However, the curvature should not drop to zero, i.e., the support disc should be installed "flat" because otherwise there is a possibility of the support disc "turning over". As a result, the membrane would no longer be pushed from the support disc onto the piston cover as intended. If the curvature of the support disc still remains even in the assembled state, this prevents the support disc from "turning over" if the pressure on it is too high, resulting in support at unintended locations or even a failure of the support and thus the valve action due to the support disc lifting off the membrane.

Preferably, the support disc, the membrane, and the piston cover are held together and fastened to the piston by at least one screw or, more generally, to a component used to seal and/or guide the extension arm from the inside of the component. Such a design is particularly easy to maintain because it is easy to disassemble, and all of the parts are reliably held together in the mounted state. Given a design comprising a support disc, a membrane and a piston cover is used, the support disc preferably comprising recesses, e.g. cutouts. The recesses simplify the further transport of the lubricating fluid that has been returned from the first region or space through the membrane. In addition, the spring force acting on the membrane can also be suitably adjusted using such recesses because the spring force can be reduced by slimming the curved, and therefore resilient, bars between the recesses. If such recesses are provided, it is advantageous for the passage holes in the membrane to lie on these recesses of the support disc in the assembled state such that there is no resistance to the further transport of fluid. Deformation of the membrane by pressurized fluid from the first region and thus passage of the fluid into the second region is thus further facilitated, and the fluid can be used at the designated location for, e.g., lubrication and cooling.

In addition, the membrane is preferably non-detachably connected to the support disc or non-destructively and detachably connected by, e.g., vulcanization. Vulcanization is a well-known and inexpensive joining method which is available for a substantial portion of the materials conceivable for the membrane (and the support disc). This type of preparation facilitates (in particular automated) final assembly because the support disc provides strength to the membrane, thus simplifying the handling of the resulting assembly.

In the context of the present disclosure, it can also be advantageous for the extension arm to be guided on its inner side by the piston, in particular by way of the guide bands, and on its outer side by a guide in the housing of the actuator. Guidance on the outer side of the extension arm can also be achieved by way of guide belts, which are a cost-effective way of enabling low-friction displacement between two components. Seals provided between corresponding guide bands prevent fluid leakage and thus ensure that the interior of the actuator is hermetically sealed.

The present disclosure is used in an electromechanical linear actuator (abbreviated as "actuator") comprising a hermetically sealed housing and an extension arm for deaerating the extension arm. In such a linear actuator, a positive pressure regularly occurs on the extension arm side when the extension arm is retracted, and a negative pressure occurs on the extension arm side when the extension arm is extended. Due to the hermetic separation of the two regions, the negative pressure should not convey fluid into the first region when extending. Using the present disclosure, the positive pressure in the extension arm is also used during retraction to return fluid that has accidentally entered the first region to the second region. Fluid that has entered the extension arm during operation is therefore reliably returned by deaerating the extension arm when the extension arm is retracted.

DETAILED DESCRIPTION

One embodiment of the present disclosure is described hereinafter with reference to the drawings.

Figure 1:
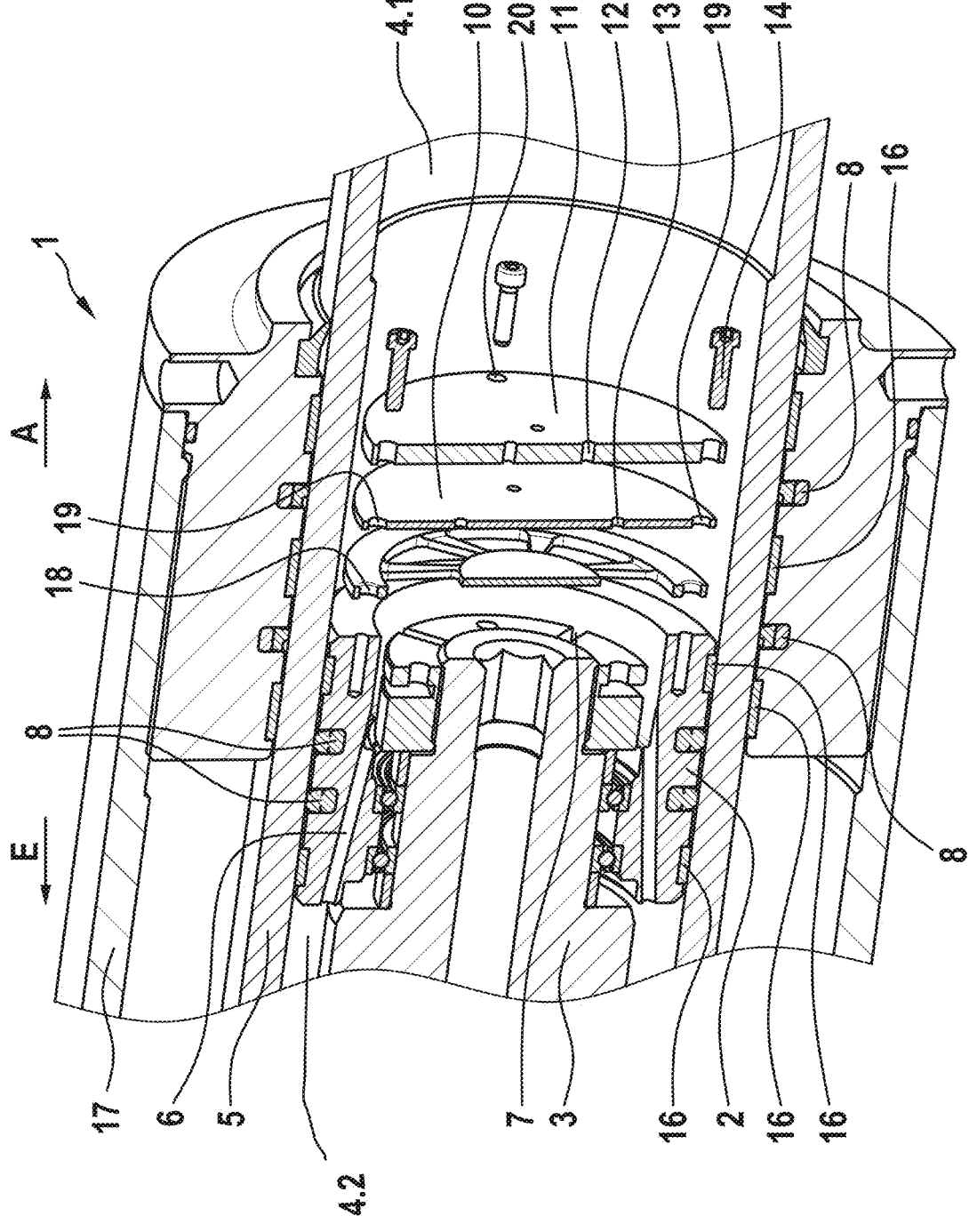
FIG. 1 is an exploded view of the deaeration of an extension arm in a linear actuator according to a first embodiment of the present disclosure.
Figure 2:
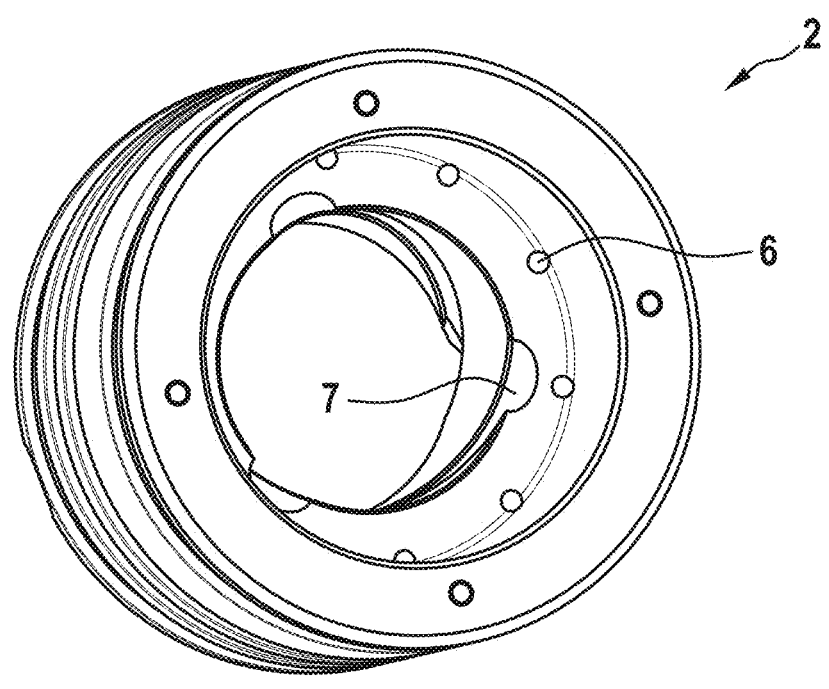
FIG. 2 shows an isometric top view of a base body of a piston, where the deaeration of the extension arm is provided.

As seen in FIG. 1, the deaeration 1 of an extension arm 5, which is in the form of a check valve and is shown in this case in a section of a linear actuator with a housing 17, comprises a support disc 9, a membrane 10, and a piston cover 11 (from left to right in the drawing). These are fastened together by screws 14 (four in the present example, of which only three are shown due to the sectional view) to a piston 2 of the linear actuator, which hermetically seals a first region 4.1 in the extension arm 5 (on the left side of the piston or sliding piston 2 and in the direction of arrow "A" in FIG. 1) and a second region 4.2 (on the "right" side of piston 2 in the direction of arrow "E") in the extension arm 5 against each other. The first region 4.1 is only delimited by the piston 2 and the extension arm 5.

Figure 4:
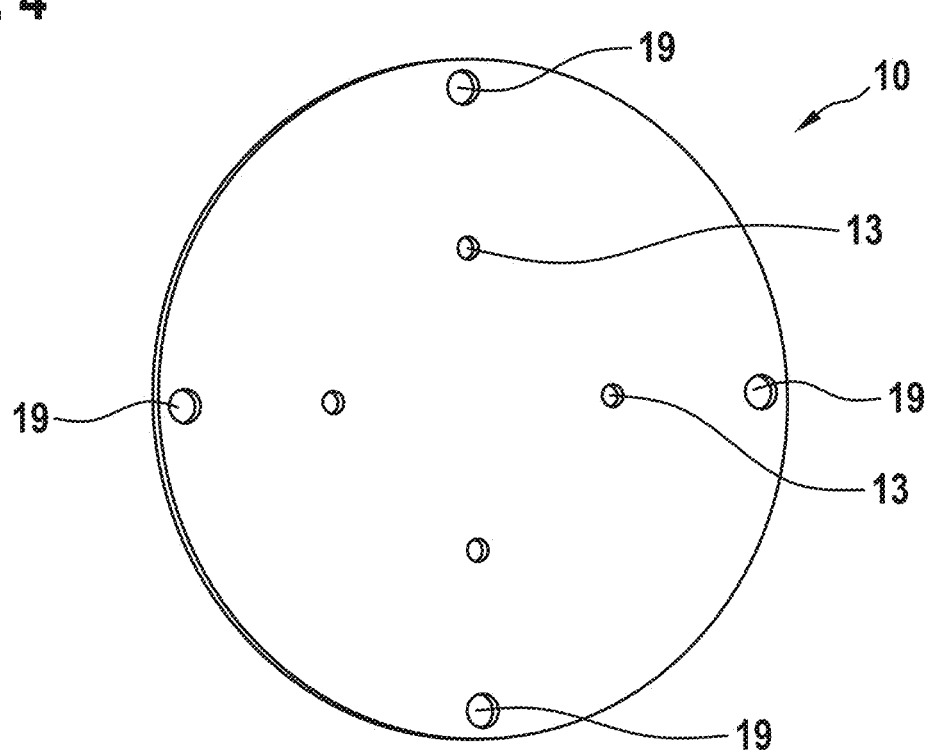
FIG. 4 shows a membrane for deaerating the extension arm in the form of a single piece.
Figure 5:
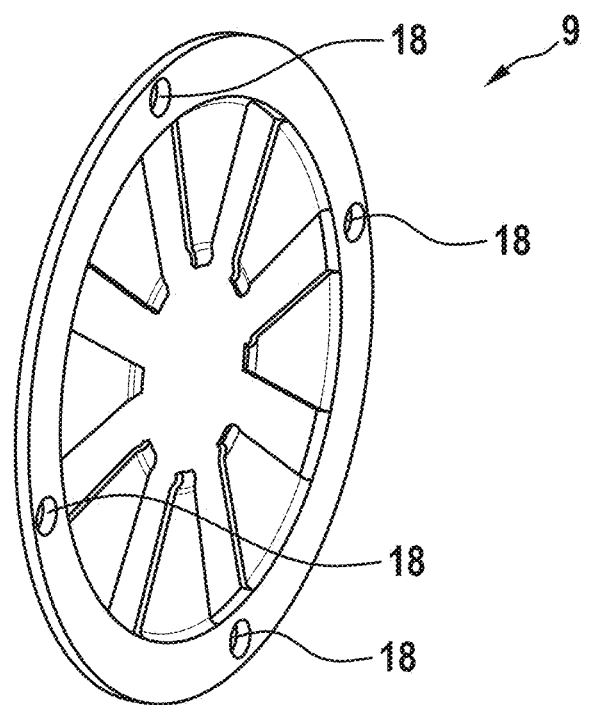
FIG. 5 is a single piece illustration of a support disc for deaerating the extension arm.

The support disc 9 is curved in its original form (shown in more detail in FIG. 5) and is pretensioned via assembly on the piston 2 using screws 14. In the embodiment explained hereinabove, the support disc further comprises passage screw holes 18. In addition, recesses between bars that hold a central part and an outer ring of the support disc can be seen on the support disc 9. In the embodiment, the membrane 10 (shown in more detail in FIG. 4) is applied on the support disc 9; by way of example, it is vulcanized. However, it is also possible in principle for the membrane to be "loosely" clamped between the support disc 9 and the piston cover explained hereinafter. This membrane 10 comprises first passage holes 13. In addition, in the embodiment explained hereinabove, passage screw holes 19 are also provided on the membrane, which align with the holes 18 in the support disc 9 in the installed state.

Figure 3:
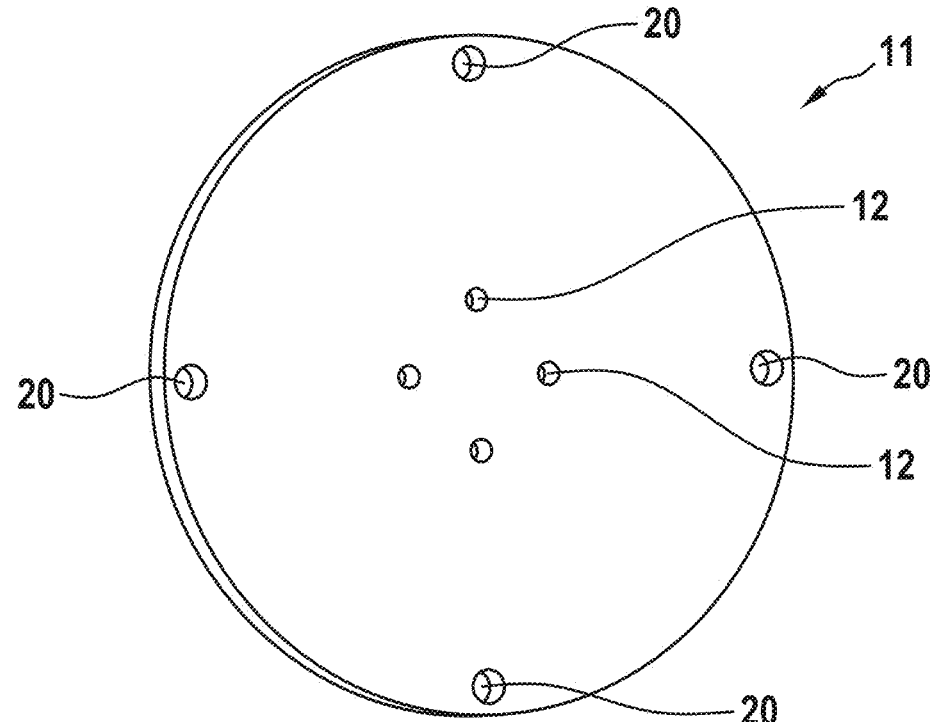
FIG. 3 shows a piston cover for deaerating the extension arm in the form of a single piece.

The piston cover 11 shown in FIG. 3 comprises second passage holes 12, which are arranged at an offset from the first passage holes 13 through the membrane 10. In addition, passage screw holes 20 are also provided in this case and are aligned with the passage screw holes 18 and 19 in the support disc 9 and the membrane 10 in the installed state. The screws 14 are screwed through these passage holes 18 to 20 into threaded holes in the piston, by way of which the support disc 9, the membrane 10, and the piston cover 11 are fastened to the piston 2. If the support washer 9, and thus the membrane 10, is pressed onto the piston cover 11 by screwing, this results in a seal despite the passage holes 12, 13 because the passage holes 12, 13 are angularly offset from each other and, in addition, the pretensioning of the support disc 9 also forces or pushes the membrane 10 against the piston cover 11. As a result, the first region 4.1 and the second region 4.2 in the extension arm 5 are normally sealed against each other.

If the center sleeve 5 retracts in the second direction (retraction direction) E, especially when retracting at high speed, the pressure in the hermetically sealed first region 4.1 in the extension arm 5 increases. The pressure on the membrane 10 therefore also increases due to the passage holes 12 through the piston cover 11. If this pressure on the membrane 10 exceeds the pretension acting against pressure through the support disc 9, in particular if incompressible liquid has entered the region 4.1, then the membrane 10 is lifted. As a result, the lubricating fluid, particularly in the case of an incompressible liquid that has "inadvertently" entered the first region 4.1 (the internal space of the extension arm 5 on the side of the piston 2 on which the support disc 18 rests), is able to flow in the retraction direction "E" of the extension arm 5 and thus ensure pressure equalization. As a result, the extension arm 5 is able to be fully retracted, even if incompressible lubricating fluid in a hermetically sealed extension arm 5 would otherwise prevent this. The lubricating fluid can continue to flow through holes 6 and grooves 7 in the piston 2 and then enters the second region 4.2 in the tube and/or a longitudinal channel in the threaded spindle (also abbreviated as "spindle") 3 of the longitudinal actuator such that it can continue to contribute to the lubrication and cooling of the actuator.

When extending the extension arm 5 in the first direction (extending direction) A, the pressure conditions described above are reversed. As a result, the membrane 10 is pressed against the fixed piston cover 11 by the pretensioning of the support disc 9 and also by the relative positive pressure of the lubricating fluid (in the first direction A; from the left in FIG. 1). Consequently, the sealing action is enhanced, and the fluid cannot pass through the piston seal into the interior space 4 of the center sleeve beyond the piston cover 11. Instead, the fluid is used elsewhere, e.g., past the spindle nut (not shown in this case) and/or passed through the spindle drive (also not shown) in order to be able to lubricate and cool effectively in that location.

In this manner, the deaeration 1 of the extension arm 5 is in the form of a check valve. Compared to a conventional ball or cone check valve, which could alternatively be installed in the piston 2 to achieve a similar effect, the solution according to this embodiment is very flat. In addition, the membrane valve-based deaeration 1 of the extension arm 5 has a better return effect than, for example, a conventional spring seat valve as a check valve due to the sensitive response to pressure differences. Even with rapid back and forth movements of the linear actuator, a fluid flow against the intended direction can be avoided and a fluid flow in the desired direction can be achieved.

As seen in reference to FIG. 1, the check valve according to the disclosure can interact particularly advantageously with a guide of the extension arm 5 in the actuator, in which the extension arm 5 is guided both on its outer side in a closure of the housing 17 and on its inner side on the piston 2 by way of guide bands 16. The guide bands 16 are provided in corresponding grooves in the piston 2 and in the end of the housing 17 and provide a low-friction guidance of the extension arm in the housing 17 and on the piston 2. In addition, such guide bands are inexpensively available in different sizes, so their use in actuators of all sizes is possible and achieves cost savings compared to other methods for creating low-friction sliding surfaces.

In summary, the disclosure discloses an actuator comprising a housing 17, an extension arm 5, and a threaded spindle 3. The threaded spindle 3 is rotatably supported on the housing 17 with respect to the center axis of the spindle. The extension arm 5 projects slidably out of the housing 17 in the direction of the center axis. The housing 17 and the extension arm 5 together surround an internal space 4.1, 4.2, whose volume changes as the extension arm 5 moves. One end of the threaded spindle 3 projects into a tubular portion of the extension arm 5, regardless of the position where the extension arm 5 is located. The tubular portion extends about the center axis with a constant internal cross-sectional shape. The end of the threaded spindle 3 is connected to a piston 2, which divides the internal space into a first region 4.1 and a second region 4.2 such that the first and second regions 4.1, 4.2 are separated from each other in a fluid-tight manner. The first region 4.1 is delimited only by the piston 2 and the extension arm 5. The second region 4.2 is sealed against the environment in a fluid-tight manner. A check valve 9, 10, 11 is arranged between the first region 4.1 and the second region 4.2 in the piston 2. The check valve passes fluid in a first direction E from the second region 4.2 to the first region 4.1 of the extension arm 5 and blocks the passage of fluid in a second direction A opposite to the first.

What is claimed is:

1. An actuator, comprising a housing, an extension arm, a threaded spindle, and a check valve, wherein:
   the threaded spindle is rotatably supported on the housing with respect to a center axis of the threaded spindle,
   the extension arm slidably projects from the housing in a direction of the center axis,
   the housing and the extension arm together surround an internal space, whose volume changes when the extension arm moves, wherein one end of the threaded spindle projects into a tubular portion of the extension arm regardless of a position where the extension arm is located, the tubular portion extends with a constant internal cross-sectional shape about the center axis, wherein an end of the threaded spindle is connected to a piston which divides the internal space into a first region and a second region such that the first and second regions are separated from each other in a fluid-tight manner, the first region is only delimited by the piston and the extension arm, wherein the first region is sealed against the environment in a fluid-tight manner, and the second region is also sealed against the environment in a fluid-tight manner, wherein the check valve is (i) arranged between the first region and the second region in the piston, and (ii) configured to pass fluid in a first direction from the second region into the first region of the extension arm and block fluid in a second direction opposite the first direction.

2. The actuator according to claim 1, wherein:

the check valve comprises a support disc, a membrane, and a piston cover, and the support disc is configured to push the membrane onto the piston cover such that (i) in a first operating position, an interior space of the extension arm is sealed, and (ii) in a second/other operating position, the membrane is removed from the piston cover to enable a fluid connection between passage holes in the membrane and passage holes in the piston cover.

3. The actuator according to claim 2, wherein the support disc is configured to feature a pretension that forces the membrane onto the piston cover.

4. The actuator according to claim 2, wherein the support disc has a curvature in an original state, and the curvature in an assembled state is aligned in a direction of the membrane.

5. The actuator according to claim 4, wherein the support disc is configured to remain curved even in the assembled state.

6. The actuator according to claim 2, wherein the support disc, the membrane, and the piston cover are held together and fastened to the piston by at least one screw.

7. The actuator according to claim 2, wherein the support disc comprises recesses.

8. The actuator according to claim 7, wherein the passage holes in the membrane lie on the recesses of the support disc in an assembled state.

9. The actuator according to claim 2, wherein the membrane is connected to the support disc in a non-destructively detachable manner on the support disc.

10. The actuator according to claim 1, wherein the extension arm is guided on its inner side through the piston by way of guide bands, and on its outer side through a guide in the housing of the actuator.

* * * * *